(12) United States Patent
Waggener et al.

(10) Patent No.: US 8,014,316 B2
(45) Date of Patent: Sep. 6, 2011

(54) SYSTEM, METHOD AND COMPUTER-READABLE STORAGE MEDIUM FOR CALCULATING ADDRESSING AND BANDWIDTH REQUIREMENTS OF A NETWORK

(75) Inventors: Michelle A. Waggener, Colorado Springs, CO (US); Michael U. Bencheck, Richardson, TX (US); Scott Ray Kotrla, Wylie, TX (US); Matthew William Turlington, Richardson, TX (US); Christopher Nicholas DelRegno, Rowlett, TX (US); Richard C. Schell, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 560 days.

(21) Appl. No.: 11/873,827

(22) Filed: Oct. 17, 2007

(65) Prior Publication Data

US 2009/0129289 A1    May 21, 2009

(51) Int. Cl.
*H04L 12/28* (2006.01)
(52) U.S. Cl. .................. 370/254; 370/235; 370/395.2; 370/395.21
(58) Field of Classification Search .................. 370/235, 370/254, 395.2, 395.21
See application file for complete search history.

(56) References Cited

U.S. PATENT DOCUMENTS

| | | | |
|---|---|---|---|
| 5,991,292 A * | 11/1999 | Focsaneanu et al. | 370/352 |
| 6,252,952 B1 * | 6/2001 | Kung et al. | 379/114.1 |
| 6,810,031 B1 * | 10/2004 | Hegde et al. | 370/351 |
| 7,477,607 B2 * | 1/2009 | Luss | 370/238 |
| 7,583,602 B2 * | 9/2009 | Bejerano et al. | 370/238 |
| 2002/0154655 A1 * | 10/2002 | Gummalla et al. | 370/468 |
| 2003/0112757 A1 * | 6/2003 | Thibodeau et al. | 370/231 |
| 2004/0252714 A1 * | 12/2004 | Oh et al. | 370/437 |
| 2005/0220014 A1 * | 10/2005 | DelRegno et al. | 370/230 |
| 2005/0273823 A1 * | 12/2005 | Brady et al. | 725/76 |
| 2006/0072457 A1 * | 4/2006 | Noble | 370/230 |
| 2006/0146863 A1 * | 7/2006 | Spinar et al. | 370/449 |
| 2007/0147247 A1 * | 6/2007 | Kalonji et al. | 370/235 |
| 2007/0147837 A1 * | 6/2007 | Yoo et al. | 398/72 |
| 2008/0005329 A1 * | 1/2008 | Bauman et al. | 709/226 |
| 2008/0025327 A1 * | 1/2008 | Kumar | 370/401 |
| 2009/0175235 A1 * | 7/2009 | Spinar et al. | 370/329 |

* cited by examiner

*Primary Examiner* — Ayaz Sheikh
*Assistant Examiner* — Peter Chau

(57) ABSTRACT

Apparatuses, methods and computer-readable storage mediums are provided for calculating estimated addressing and bandwidth requirements of a customer domain, such as to facilitate designing the respective domain. A method includes selecting customer premises equipment (CPE) of a domain including a plurality of CPEs, where each CPE includes one or more devices, and one of the one or more devices include an interface with which the domain communicates with the respective CPE. The method also includes determining if the interface of the selected CPE comprises a router, and calculating an addressing requirement of the selected CPE, where the addressing requirement includes a number of device addresses for the selected CPE. The method may additionally or alternatively include analyzing traffic patterns of the selected CPE with respect to one or more other CPEs, and based on the analysis, calculating a bandwidth requirement of the selected CPE.

10 Claims, 9 Drawing Sheets

SYSTEM, METHOD AND COMPUTER-READABLE STORAGE MEDIUM FOR CALCULATING ADDRESSING AND BANDWIDTH REQUIREMENTS OF A NETWORK

FIELD

An apparatus and method are provided for generally calculating requirements of a network, and for more particularly calculating addressing and/or bandwidth requirements of a network to thereby to facilitate setting up that network for a customer accessing one or more services via that network.

BACKGROUND

A commercial telecommunications network operated by a service provider supports voice and data communications between customer locations and includes an access network and a core network. Generally, customer devices communicatively couple to the access network, which in turn connects to the core network. The access network includes what many people refer to as "the last mile," that is, the connectivity from a customer location, such as an office building, to a point where a service provider has significant facilities, such as a metro hub or a "service edge" at the periphery of the core network. In contrast to the access network, the core network usually provides transport of large aggregate flows over long distances and handles the selective routing of each customer's voice and data traffic to other locations served by the network. The access network generally comprises a series of switches, aggregators, multiplexers, demultiplexers, routers, hubs, and the like which collectively serve to provide connectivity between customers' equipment and the core network.

Customer sites in the vicinity of a service provider's edge, or an intermediate hub that provides connection to the service edge, must be connected to the service edge via some form of access circuit. Traditionally, it has been more practical for a core network service provider to operate a few strategically placed facilities to serve a large number of customers in a metropolitan area rather than to extend the service provider's core network to every physical location where customers may reside. Providing access services between a customer's location and a metro hub or a service edge may involve installing electrical or optical cables between the service provider and the customer site. In some cases, the service provider installs and owns this access link connected directly to the customer location. More often, however, the existing facilities of a local telephone carrier are leased to provide this connectivity. The well-established local telephone facilities provide at least twisted-pair subscriber loop connectivity to virtually every potential customer location in a metropolitan area. In the case of larger business locations and multi-tenant commercial sites, local telephone facilities typically comprise a large quantity of telephone wires or broadband access to the sites.

The services required by customers, residential or business, vary greatly in the type of access services, bandwidth, quality of service (QoS), type of legacy equipment, and the like. Types of services typically include frame relay services, asynchronous transfer mode (ATM) services, broadband services, point-to-point private line services, voice services, and the like. Accordingly, the access service provider must be prepared to provide many types of services to customers of various sizes and needs.

Furthermore, the access service provider must be capable of meeting the customers' current and future needs in terms of bandwidth, throughput, QoS, and the like. For example, a given customer may start with relatively small bandwidth needs yet expand to needing high-bandwidth connections such as a SONET OC-3 or OC-12 connection. Additionally, customers may require ATM services and frame relay services to support legacy systems while implementing newer applications and communications that are based on Ethernet.

Typically, the access service provider provisions and handles each of these services separately and does not attempt to aggregate the traffic from various types of services. Treating the traffic separately in this manner, however, can be expensive. Typically, the access network provides transport, aggregation, grooming, and switching for each of these types of services independently, which in turn requires the access service provider to provision each of these services separately. Generally, each type of service utilizes different interface and framing standards, and in particular, each type of service typically utilizes a different set of protocols. As a result, current access network elements must be equipped to interface with and operate upon flows for each type of service the elements are expected to handle. Each network element in an access network presently must deal with the particular format, addressing and protocol aspects of each type of access communication service it supports. This makes for costly and complex network elements and interferes with having flexibility to accommodate rapid shifts in resources allocated to different flows or different service types and to accommodate adoption of new service types.

Although techniques have been developed for providing services to customers in a cost effective manner that allows the service provider to provide various types of services to one or more customers, it is generally desirable to improve upon existing techniques.

DETAILED DESCRIPTION OF ILLUSTRATIVE EMBODIMENTS

Exemplary embodiments are described hereinafter with reference to the accompanying drawings, in which exemplary embodiments and examples are shown. Like numbers refer to like elements throughout.

Exemplary embodiments will be described in a specific context, namely, providing aggregation services to one or more customers in an office building communicatively coupled to a telecommunications network via a TDM (time division multiplexing) communications link, for example a DS3. The exemplary embodiments may also be applied, however, to other types of devices, networks, communications links, and the like. Furthermore, while specific network configurations are illustrated and discussed herein, it is noted that network configurations may vary to include fewer or additional elements, such as wireline or wireless routers, gateways, bridges, ATM (asynchronous transfer mode) switches, frame relay switches, firewalls, and the like. The illustrated embodiments are provided for illustrative purposes only and are provided only to aid in the explanation and understanding of the concepts. Aspects are equally applicable to many types and configurations of networks and communications protocols.

It is further noted that, unless indicated otherwise, functions described herein may be performed in hardware, software, firmware or some combination thereof. In one exemplary embodiment, however, the functions may be performed by a processor such as a computer or an electronic data processor in accordance with code such as computer program code, software, and/or integrated circuits that are coded to perform such functions, unless otherwise indicated. It should be understood, however, that some of the functions described herein may not be performed in hardware, software, firmware or some combination thereof. Instead, these functions may be performed by one or more persons or users who may be users of such hardware, software, firmware or combination. Thus, an apparatus may be shown, described and claimed as including a processor configured perform and/or facilitate performance of a method. In such instances, the processor may perform one or more steps of that method in concert with one or more persons acting to perform other steps of that method.

Figure 1:
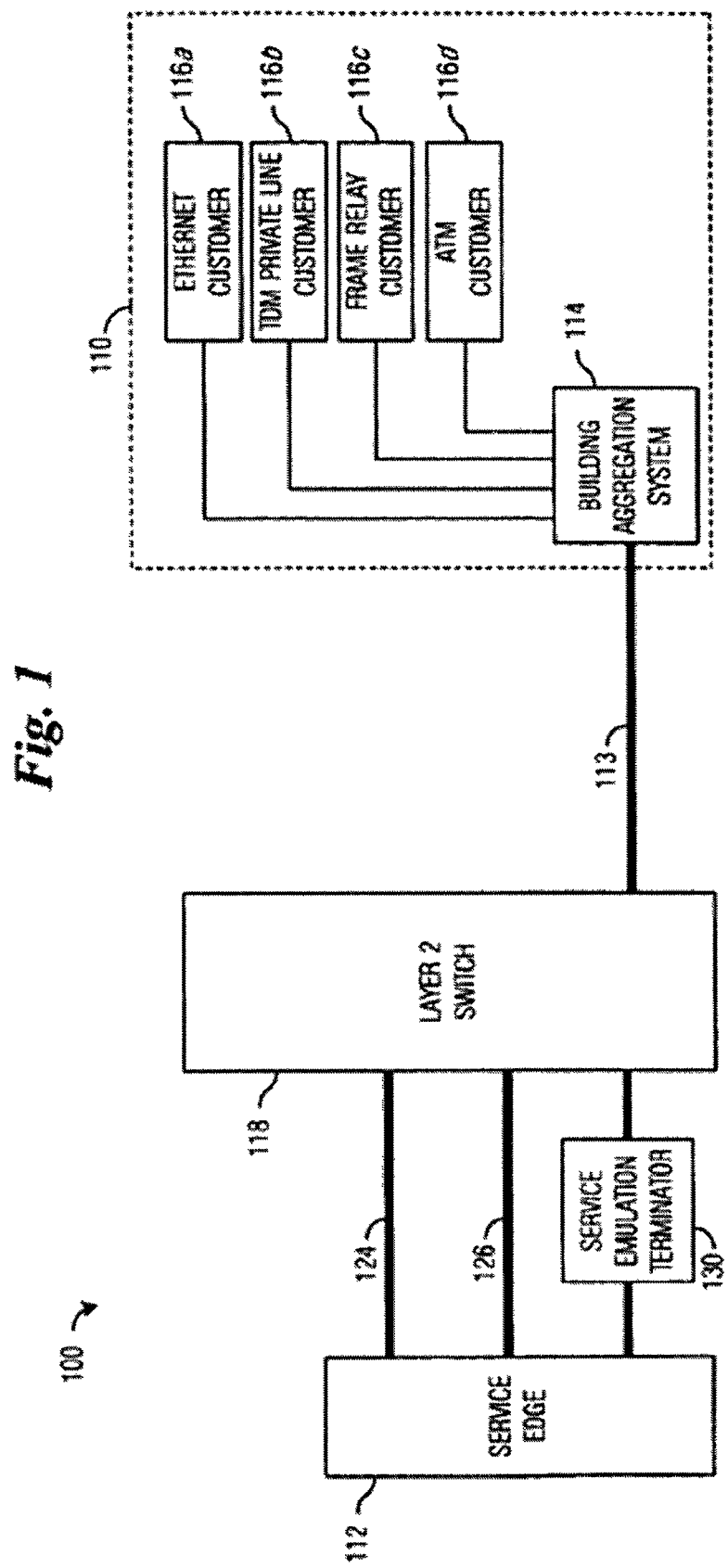
FIG. 1 is a network diagram of an access network embodying features of exemplary embodiments.

FIG. 1 is a network diagram in accordance with an exemplary embodiment. FIG. 1 illustrates an access network 100 to which a customer site 110 may be coupled, such as to access the services of a service edge 112. The customer site include, for example, an office building housing a large number of users, such as employees of one or more business enterprises. The users or businesses may subscribe to the services of a service provider whose point of presence is the service edge.

Generally, the service edge 112 may represent one or more access points to the service provider's network, which may comprise one or more core networks (not shown). A core network may include, for example, a system of TDM switches, such as a network of Class 3 telephone switches. A core network may also include an ATM and/or a frame relay network covering much the same geographical territory as the TDM network. Moreover, a network of IP (Internet Protocol) routers may also be supported in a core network. While each of one or more of these networks may overlap or cover much the same geographical territory, the respective networks may be designed to efficiently carry particular types of traffic or exhibit particular properties that are amenable to certain types of traffic. Although this "multi-planar" network situation may frequently be encountered, it should be understood that exemplary embodiments may be equally applicable to a converged core network where native layer-2 handoff at the service edge may be desirable. The service edge is illustrated as a single network element for illustrative purposes only, but may actually include multiple network elements or multiple access interfaces having different capabilities.

By way of example, sources of, or customer premises equipment (CPE) for, different types of communications are depicted within a customer site 110. These sources may include an Ethernet customer 116a coupled to a building aggregation system (BAS) 114 over any form of connectivity amenable to Ethernet traffic, such as a 100BaseT, Gigabit Ethernet (GbE) or DSL (digital subscriber line) connection. Another source of traffic may be private line customer 116b, which may be coupled to the building aggregation system via DS1 line. Source 116c represents frame relay customers having their frame relay traffic carried over TDM facilities such as DS1 lines to the building aggregation system. ATM customer 116d represents ATM customers having their ATM cell traffic carried over TDM facilities such as DS1 lines to the building aggregation system. Other types of connections may be used as required to support specific customers' needs. Each of one or more CPEs 116a-116d may comprise one or more devices. For example, the Ethernet customer 116a may include a wireline or wireless router or switch communicatively coupled to other wireline or wireless routers, switches, hubs, user workstations, servers, printers, IP phones or the like. The CPEs 116a-116d may be collectively referred to as CPE 116.

As noted above, customers within a building may require different types of access, or a single customer may require different types of access for different services. As will be discussed in greater detail below, the building aggregation system 114 may provide an interface to one or more CPEs, which may be operating in accordance with one or more communications protocols; and may aggregate the traffic for transmission to the service edge 112. In this manner, economies of scale may be realized by combining traffic from a plurality of less-than-fully utilized communications channels. A building aggregation system may serve multiple buildings within a reasonable proximity, such as a corporate, institutional campus or any other collection of sites where it is feasible.

Other components, such as demarcation devices, repeaters, amplifiers, and the like, may be communicatively coupled between the building aggregation system 114 and each of one or more CPEs 116a-116d. A demarcation device, commonly used when providing Ethernet services (such as that provided to an Ethernet customer, represented by CPE 116a), is the point at which the customer connects to the resources of the access network 100. Further, additional repeaters (not shown) or amplifiers (not shown) may be required based upon, for example, the length of the wire runs.

On the network side, the building aggregation system 114 may be communicatively coupled to one or more hubs or switches, represented by switch 118, to provide connectivity between the customer location 110 and the service edge 112. The communications link 113 between the building aggregation system and the switch may include, for example, a TDM communications link, such as a DS3 or SONET OC-n. In accordance with one exemplary embodiment, these TDM links utilize a protocol such as X.86, GFP (Generic Framing Protocol), PPP (Point-to-Point Protocol), or the like for accomplishing packet data transport over TDM. The communications path between the customer location and the service edge is illustrated as a simple two-hop connection for illustrative purposes only. It should be understood, however, that the communications path between the customer location and the service edge may contain additional or fewer hops, and may include different paths for traffic in either direction between a service edge and a customer site. The customer location, through the building aggregation system, may be coupled to service edge through a network of switches and other equipment and facilities.

Additional network elements may be positioned between the building aggregation system 114 and the switch 118. For example, the building aggregation system may be configured to accept a DS3 communications link as discussed above, but the communications link from the access network to the building 110 may comprise a larger communications link, such as an OC12 or OC48 optical link. In such instances, which are common in an "on-network" environment wherein the access network is owned by the service provider, an add/drop multiplexer (ADM) may be utilized to separate the DS3 traffic from and interject the DS3 traffic onto the larger OC12 or OC48 link. In an "off-network" environment, on the other hand, a smaller DS3 link may be leased directly from another party, such as a local telephone company or other service provider.

In accordance with one exemplary embodiment, the layer-2 switch 118 may provide switching and routing of traffic based upon information applied to the traffic and without having to examine the content of the customer data in the traffic. The information applied to the traffic may correspond roughly to Layer 2 or the "data link layer" of the OSI Reference Model. The layer-2 switch may be coupled to a large number of customer sites 110 and the building aggregation systems 114 to perform an intermediate aggregation and distribution function within the access network 100. In some instances, the layer-2 switch may also be coupled directly to some or all of the CPE 116. An example of a layer-2 switch suitable for use with exemplary embodiments is disclosed in U.S. patent application Ser. No. 10/858,517, entitled: System and Method for Providing a Multiple-Protocol Crossconnect, the content of which is hereby incorporated by reference in its entirety.

The building aggregation system 114 may apply information to the traffic that has significance for affecting the handling of carrier-tagged communications within the access network and may be interpreted and acted upon by layer-2 switch 118 or other elements. The building aggregation system may also receive communications bearing this information and may route the communications to specific customers in response to the information.

In accordance with exemplary embodiments, the building aggregation system 114 may be equipped or otherwise configured to serve as one end of a plurality of carrier-tagged flows. In this regard, a carrier-tagged flow represents a logical communications channel or flow established to carry carrier-tagged communications between two or more parties, or two or more points served by a communications system. The carrier-tagged communications may include, for example, voice, data, audio, video or any other type of communications.

A carrier-tagged flow may be implemented using a service emulation instance, such as a pseudowire as described IETF (Internet Engineering Task Force) Request for Comments document RFC 3985, entitled: Pseudo Wire Emulation Edge-to-Edge (PWE3) Architecture (March 2005), the content of which is hereby incorporated by reference in its entirety. This technology allows a packet-switched network to emulate other types of packet or TDM transport services. For example, a pseudowire may be implemented in an Ethernet network, yet may provide transport of communications that mimics the attributes and performance of common data link protocols, such as ATM, frame relay, as well as SONET/SDH or DSn signals. An Ethernet-based pseudowire may employ variable length packets even when carrying fixed-length cells or frames, such as 53-byte ATM cells.

A pseudowire may be implemented along a tunnel implemented in a packet-switched network. Some types of tunnels that may be suitable for carrying pseudowires, or other types of communications that may be employed in conjunction with exemplary embodiments, include Label Switched Paths (LSPs) according to the Multi-Protocol Label Switching (MPLS) protocol, Layer-2 Tunneling Protocol (L2TP) tunnels, IPsec tunnels or the like.

Another example of a technique suitable for implementing a carrier-tagged flow is a logical networking tagged flow, such as virtual local-area network (VLAN) communications or the like. One exemplary technique for achieving VLAN logical sub-networking is described in IEEE Standard 802.1Q. Briefly, a VLAN may enable designating and acting upon data packets in a manner that makes multiple LAN communication flows carried over a commonly shared communication path appear to be partitioned from one another as if traveling over separate, dedicated LAN connections. In accordance with an exemplary embodiment, a VLAN tagging approach may also be used for carrier-tagging of flows.

In accordance with exemplary embodiments, carrier VLAN tags having significance for routing and processing in the access network may be used to encapsulate and tag customer flows. As customer flows are encapsualted and/or tagged, they may or may not already include additional, imbedded VLAN tags having significance within the customer's virtual network in accordance with conventional IEEE 802.1Q usage. In accordance with exemplary embodiments, the VLAN tagging approach may be reused for carrier-tagging purposes and may be locally significant on any port, with tag values possibly being replaced on a hop-by-hop basis.

In accordance with exemplary embodiments, carrier tags applied to traffic to support handling of flows through an access network, whether in the form of tunnel labels, pseudowire labels, VLAN tags or the like, may be 'stackable' to any depth to support efficient flow management in the context of hierarchical aggregation and distribution between service edge(s) and customer locations.

In addition to supporting access communications that enable carrier tag stacking, a building aggregation system 114 in accordance with exemplary embodiments may serve several roles in the context of a service-agnostic access network. The building aggregation system may adapt a wide variety of customer traffic to be carried in the form of carrier-tagged flows. Where a packet switched network is used as an underlying access transport, the use of carrier-tag switching may enable the efficiencies and flexibility of packetization to be realized in an access network without burdening the access network elements with the specific protocols or addressing used in the carried traffic.

To coordinate the assigning of carrier tags to traffic flows, the building aggregation system 114 may participate in label resolution protocols with other elements, and may receive provisioning instructions from remote management systems. To support the deployment of service emulation, such as pseudowire technology, in an access network to achieve service flexibility, the building aggregation system may serve as a terminal end for a large number of service emulation instances of different emulated types and may provide mapping and forwarding between customer flows and access network paths as identified by tunnel labels or service emulation instance mapping identifiers. The building aggregation system may also implement QoS (quality of service) functions for all types of flows, augmenting similar measures that may be performed at a service edge. Other possible roles and functions of the building aggregation system are possible.

The building aggregation system 114 may be used in a carrier-tag oriented access network wherein each of one or more carrier-tagged flows is identified by a carrier tag having a particular tag value. For example, a carrier-tagged flow implemented as a service emulation instance is identified by a service emulation instance mapping identifier. In the case in which a pseudowire is used as a service emulation instance, the service emulation instance mapping identifier may take the form of a pseudowire label. Carrier tags may be locally significant on any port and the tags can be swapped on a hop-by-hop basis as needed to provide a large number of flows using the finite number of identifier values that are available (approximately one million in the case of pseudowire labels). In this manner, switching in the access network can be simplified by encapsulating traffic in carrier-tagged flows and by interpreting and manipulating the corresponding carrier tags.

An access network 100 in accordance with exemplary embodiments may transparently support a mixture of flow types and customer content, including any customer-specific addressing or virtual networking fields imbedded in the customer content. The pseudowire architecture, as described in documents promulgated by the IETF, may provide one example of an approach involving encapsulation and labeling of traffic that may be adapted for use as a carrier-tagged flow. It should be noted, however, that other protocols may be used, and exemplary embodiments may be implemented with other types of protocols and physical connections.

The building aggregation system 114 may couple traffic of various types, such as traffic from the CPE 116a-116d, onto the appropriate corresponding carrier-tagged flows established for reaching the service edge. Where service emulation instances are used as carrier-tagged flows, a service emulation instance terminator 130 may serve as the other end of a number of service emulation instances which have originated at one or more building aggregation systems and passed through layer-2 switches 118. The service emulation instance terminator may switch or route traffic from service emulation instances to a corresponding port and/or flow communicatively coupled to the service edge 112. The building aggregation system, layer-2 switch, service emulation instance terminator and the communications links therebetween may coordinate to simultaneously function as any of the various data-link layer transport types that may be required by customers, including ATM, frame relay, TDM, Ethernet/IP, and the like.

Alternatively, a service edge 112 may incorporate the functions of a service emulation instance terminator 130 or may otherwise be capable of directly accepting and processing carrier-tagged flows. In this case, a service edge may be coupled more or less directly to the layer-2 switch 118 and the communications to and from the service edge may bear flow-identifying carrier tags in the form of pseudowire labels, tunnel labels, VLAN tags or the like. The service emulation instance terminator may nevertheless be useful in situations where an existing or legacy service edge facility lacks the ability to handle carrier-tagged access communications, service emulation instances or, more specifically, pseudowires. As mentioned earlier, the service edge may actually represent several separate access points, perhaps to different types of core networks. Some access points within the service edge may be amenable to carrier-tagged flows whereas others may not be. Links 124 and 126 may represent links to TDM-capable ports on the service edge from TDM ports on the layer-2 switch. It is also possible that, for example, one or both of these links may represent packetized data links or may represent a service edge that is able to accept carrier-tagged flows, such as carrier-tagged pseudowires, directly without requiring the service emulation instance terminator. A service emulation instance terminator suitable for use with exemplary embodiments is disclosed in U.S. patent application Ser. No. 10/858,491, entitled: Apparatus and Method for Terminating Service Emulation Instances, the content of which is hereby incorporated by reference in its entirety.

In an exemplary embodiment, Ethernet may be utilized as the layer-2 protocol over which carrier-tagged communications are transmitted. The application of Ethernet in the access network can be based on TDM encapsulation using X.86 or GFP, such as in the case of Ethernet over SONET (EoS). While Ethernet is desirable because it supports variable length packets or frames, other protocols or frame formats may be used for the transport and processing of access communications.

In an implementation using service emulation instances, the building aggregation system 114 may apply a unique service emulation instance mapping identifier to each of one or more flows from the CPE 116a-116d, and transmits the frames or packets bearing the traffic and service emulation instance mapping identifiers to the layer-2 switch 118. Similarly, the building aggregation system may receive data associated with a service emulation instance identifier from the layer-2 switch and convert the data to a format compatible with the corresponding CPE 116.

As another example, the building aggregation system 114 may receive Ethernet traffic from Ethernet customer 116a via the building "riser." In such instances, the building aggregation system may receive this traffic along a port that is known to correspond to Ethernet customer 116a and maintain an association between the customer's port and Ethernet traffic stream and a corresponding carrier-tagged flow. Likewise, at the other end of the carrier-tagged flow, the service emulation instance terminator 130, the layer-2 switch 118, or some other network element may deliver the customer's traffic to the service edge 112 and may coordinate with the service edge, such as by mapping of port numbers or directing of flows, to at least partially ensure that the network identifies the customer's traffic as such and appropriately handles the traffic.

In accordance with one exemplary embodiment, when a device on a customer LAN addresses Ethernet frames to the service edge 112, the destination MAC address field in the Ethernet frames may correspond to that of the service edge itself or some other remote device port rather than being associated with any of the access network elements. CPE 116 may be provisioned to resolve the address of the service edge such that communications intended to be sent to the service edge will arrive at a port of the building aggregation system. The building aggregation system 114 does not need to act as a layer-2 termination point as it appears to the CPE, so no MAC learning behavior or other typical LAN bridge behavior is required of the building aggregation system. In various configurations, however, MAC learning and routing of Ethernet frames may be performed at or proximate to the layer-2 switch 118, as will be explained below for example in the context of providing a virtual private LAN service (VPLS) to Ethernet customers 116a.

To establish or modify a customer's carrier-tagged flow between the CPE 116 and the service edge 112, the customer may indicate to the network service provider the desire to establish communications in a particular manner. This request may be submitted either manually or automatically through a user network interface (UNI). The establishment of communications through the access network 100 shown may originate in a variety of ways. To coordinate fulfillment of an access communications request, a network management system, provisioning function or the like, may dispatch provisioning and configuration instructions to the building aggregation system 114, layer-2 switch 118, service emulation instance terminator 130 or other network elements. To varying degrees, these elements may perform some functions autonomously or may coordinate with one another to fulfill service requests.

For convenience, the operation of exemplary embodiments discussed herein maybe described in terms of traffic flowing from the CPE 116 to the service edge 112. It should be noted, however, that the same techniques discussed herein also apply to traffic leaving the service edge and being distributed to an appropriate customer endpoint. Every element may serve a complementary role related to the direction of flow. It is also worth noting that some traffic through an access network 100 may be from one customer location to another in a given vicinity, and may not necessarily be destined for the service edge. Many of the techniques described for traffic between a customer location and a service edge would be applicable to this situation as well.

Figure 2:
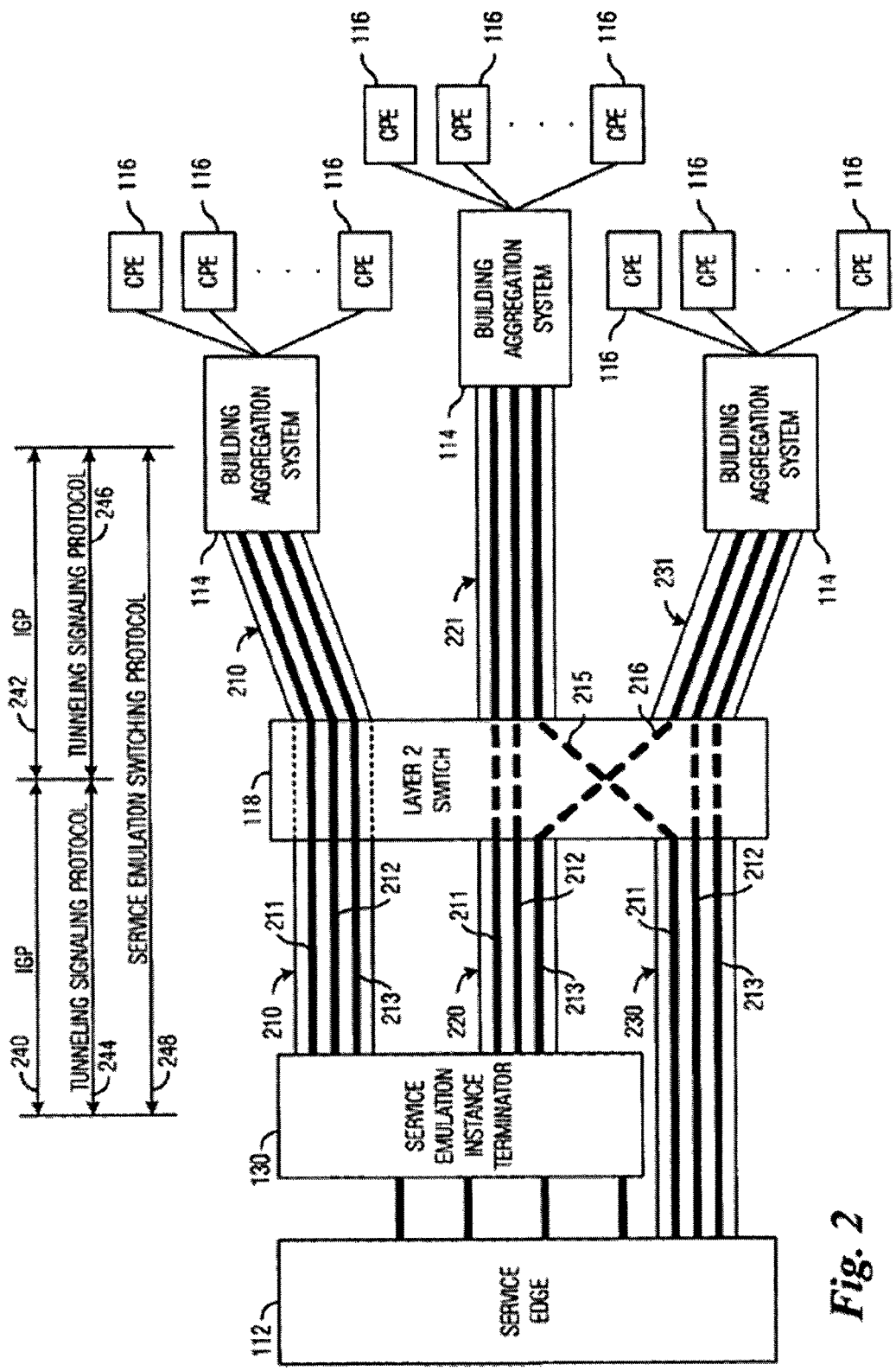
FIG. 2 is logical view of the use of service emulation instances in the access network in accordance with one exemplary embodiment.

Reference is now made to FIG. 2, which illustrates a logical view of example carrier-tagged flows through an access network in accordance with an exemplary embodiment. Customer sites (represented by CPE 116 coupled through building aggregation systems 114) are shown to be coupled, through various access network resources, to the edge of a service provider's network represented by the service edge 112, and optionally involving service emulation instance terminator 130. The layer-2 switch 118 is shown as an intermediary and may participate in grooming, aggregating and directing communications traffic in the access network, as well as performing crossover switching between TDM ports and packet-oriented ports. For clarity, FIG. 2 illustrates two-hop paths, although it is possible that there are some intervening transmission elements or other layer-2 switches along the access coupling.

In FIG. 2, tunnels in the form of label switched paths (LSPs) 210, 220, 221, 230 and 231 are shown to have been established between various building aggregation systems 114 and the service edge 112 (optionally through terminator 130). Each of one or more LSPs corresponds to a pathway or a tunnel for carrying traffic from the building aggregation system 114 to the service edge 112, or vice versa. It should be noted that FIG. 2 is provided as a logical view and that various physical implementations may be used. For example, each of one or more label switched paths may be transported, routed or switched over different physical links or the same physical link.

Each LSP is shown to be carrying a respective set of carrier-tagged flows 211, 212 and 213. In some implementations, such as when service emulation instances are used, each of one or more carrier-tagged flows may emulate a specific type of service, such as an ATM, frame relay, Ethernet or TDM/SONET service. Regardless of emulated service type, the traffic belonging to these carrier-tagged flows may be made to travel along an LSP or tunnel based upon a carrier tag applied to the traffic and a mutual understanding among the network elements as to how to handle traffic having a specific tag value.

Where service emulation instances are used to implement carrier-tagged paths, the traffic may be identified and routed through the access network 100 based on a service emulation instance mapping identifier that serves as the carrier tag (or as one part of a composite carrier tag). More specifically, where pseudowires are used as service emulation instances, a pseudowire label in each of one or more traffic packets or frames may serve as a carrier tag component.

In an implementation where logical networking tagged flows are used, an outer VLAN tag may serve as the carrier tag, or a portion thereof. A tunnel label, such as an LSP label, may also be applied to the traffic and may be used, solely or in conjunction with other fields, as the label upon which the traffic is routed through access network elements. In accordance with one exemplary embodiment, any of these possible carrier tags may be present multiple times or may be stacked in any combination with one another within the traffic packets or frames. This may be done to support various flow management arrangements that involve nesting of tunnels or flows or otherwise implementing stages of aggregation in the access network. Examples of how nested tunnels or paths may be accomplished and managed are disclosed in U.S. patent application Ser. No. 10/858,525, entitled: System and Method for Managing Communications in an Access Network, the content of which is hereby incorporated by reference in its entirety.

Each of one or more carrier-tagged flows 211, 212, 213 may carry multiple customer-specified "subflows" in a manner that is transparent to the access network. That is, the customer traffic may optionally contain additional imbedded VLAN tags having significance within the customer's Virtual Private Network (VPN) in accordance with conventional 802.1Q usage. Any VLAN tags or layer-2 VPN addressing fields that are present within the customer traffic may be encapsulated using carrier VLAN tags having significance for routing and processing in the access network. Consequently, a traffic frame or packet in accordance with exemplary embodiments may comprise some VLAN tag fields that are controlled by a customer, or have significance within the customer's private network, in addition to VLAN tags that serve as carrier tags having significance to the access network. Compared to any customer-imposed VLAN tags appearing in the traffic, the carrier VLAN tags may be derived from the operation of entirely different protocols among different elements than the customer tags. Likewise, where other forms of carrier tags are employed, such as pseudowire labels, the carrier tags may resemble customer labels or tags appearing in customer traffic, but may have different significance and may be derived from different protocols than the customer information. In accordance with exemplary embodiments, the access network 100 may be primarily concerned with the outermost labels or carrier tags that have been applied to the traffic for access network purposes, such as tunnel labels or service emulation instance mapping identifiers applied to the traffic. In accordance with exemplary embodiments, a VLAN tag format may be applied for carrier-tagging purposes and may be locally significant on any port, with tag values possibly being replaced on a hop-by-hop basis.

Label switched path 210 represents an exemplary embodiment in which the carrier-tagged flows are routed through the layer-2 switch 118 on the basis of a tunnel label. In other words, each of one or more units of traffic may be tagged with a tunnel label for use by access network elements to determine how to process, and where to send, the traffic. In such instances, a tunnel may be established from the building aggregation system 114 to the service emulation instance terminator 130. Each of one or more flows within the tunnel identified by the tunnel label, e.g., label switched path 210, may be routed or switched in the same manner, as illustrated by the dotted label switched path line and the solid-lined flows passing through the layer-2 switch. With this approach, the layer-2 switch may efficiently switch traffic among its ports by observing and acting solely or primarily upon this tunnel label present in the traffic. The layer-2 switch may not have to read and act upon a service emulation identifier, such as a pseudowire label, in order to properly route traffic of this nature.

In an alternative embodiment, the carrier-tagged flows 211, 212, 213 may be service emulation instances and each service emulation instance may be routed or switched based upon a service emulation instance mapping identifier. As shown, for example, the label switched paths 221 and 231 may be established between the various building aggregation systems 114 and the layer-2 switch 118. The other LSPs 220 and 230, then, may be separately established between the layer-2 switch and the service edge 112. This provides the option of switching individual flows within the layer-2 switch. Switching within the layer-2 switch may be based upon a service emulation instance mapping identifier present in the traffic.

As in the above example where tunnels directly connect network elements without passing through other switching or terminating elements, tunnel labels may be optional due to the point-to-point nature of the communication. Nevertheless, a tunnel label field may be included to convey useful information, possibly aside from tunnel identification.

To illustrate flow switching within the layer-2 switch 118, certain of the flows 211, 212, and 213 are illustrated as remaining together within each of the labeled switched paths. Upon reaching a switching point, such as the layer-2 switch, at the terminus of a tunnel, such as LSP 221, each of one or more flows through the access network 100 may be switched independently based upon, among other things, the type of service being provided, the requested service edge, one or more aspects of the traffic, and the like. As indicated by the dotted lines 215 and 216, each of one or more of the carrier-tagged flows within label switched paths 220, 221, 230 and 231 may be routed or switched independently of each other as they pass through the layer-2 switch, where the identification and switching of each of one or more flows may be based upon a flow identifier such as a pseudowire label. In contrast, the flows within LSP 210 may not be switched at the layer-2 switch because the tunnel extends between the building aggregation system 114 and the service emulation instance terminator 130 and, consequently, the layer-2 switch may only observe and act upon the tunnel label. A tunnel such as LSP 210 may have been established to expressly avoid switching of individual flows through the layer-2 switch. In practice, either approach, i.e., "tunneling to" or "tunneling through" the layer-2 switch, may be desirable under various circumstances.

As depicted by reference numeral 248, a label selection or service emulation switching protocol, such as the Label Distribution Protocol (LDP), may be exercised among the endpoints of a tunnel, a carrier-tagged path, a service emulation instance, a pseudowire, or the like in order to assure agreement among network elements on how traffic will be identified within the tunnel or path. In many cases, these endpoints may be the building aggregation system 114 and the service edge 112 or service emulation instance terminator 130.

Reference numerals 240 and 242 represent how routes may be chosen between the building aggregation system 114 and the layer-2 switch 118, and between the layer-2 switch and the service emulation instance terminator 130 or service edge 112. Identifying and selecting the appropriate paths through the access network may be accomplished using an interior gateway protocol (IGP) such as the Open Shortest Path First-Traffic Engineered (OSPF-TE) approach as described in IETF RFCs 2328, 2676, et al., the content of all of which is hereby incorporated by reference in its entirety. Other routing protocols are known and may be used.

Reference numerals 244 and 246 may indicate that a tunneling signaling protocol, such as the Resource Reservation Protocol (RSVP), may also be used in conjunction with other techniques during establishment of the label switched paths so that the elements involved along the path commit to allocating a specific quantity of bandwidth and other resources to support the requested flow and its performance requirements. Alternatively, it may be possible to establish static LSPs wherein little or no signaling is required. MPLS is described in documents IETF RFCs 3031, 2702, et al. maintained by the IETF, the content of all of which is hereby incorporated by reference in its entirety. Related to the negotiation of labels that are used in MPLS, the label distribution protocol (LDP) is described in IETF Request for Comments document RFC 3036, entitled: LDP Specification (January 2001), the content of which is hereby incorporated by reference in its entirety. The label distribution protocol is also discussed in IETF Request for Comments document RFC 4447, entitled: Pseudowire Setup and Maintenance Using the Label Distribution Protocol (LDP) (April 2006), the content of which is also hereby incorporated by reference in its entirety. The use of RSVP, MPLS and LDP are shown by way of example only and should not be construed as limiting the ways in which exemplary embodiments may be implemented.

The directionality of the traffic may have implications for the establishment of tunnels, service emulation instances, pseudowires, logical networking tagged paths, etc. For example, where an RSVP/LDP mechanism is used to establish label switched paths, a bi-directional link may require initiating the formation of a tunnel in one direction, originating at the building aggregation system 114, and forming the corresponding tunnel in the reverse direction by originating an RSVP request from the service emulation instance terminator 130. These tunnels may be independently formed, may have different QoS requirements, and may take different routes between the building aggregation system 114 and the service emulation instance terminator.

Figure 3:
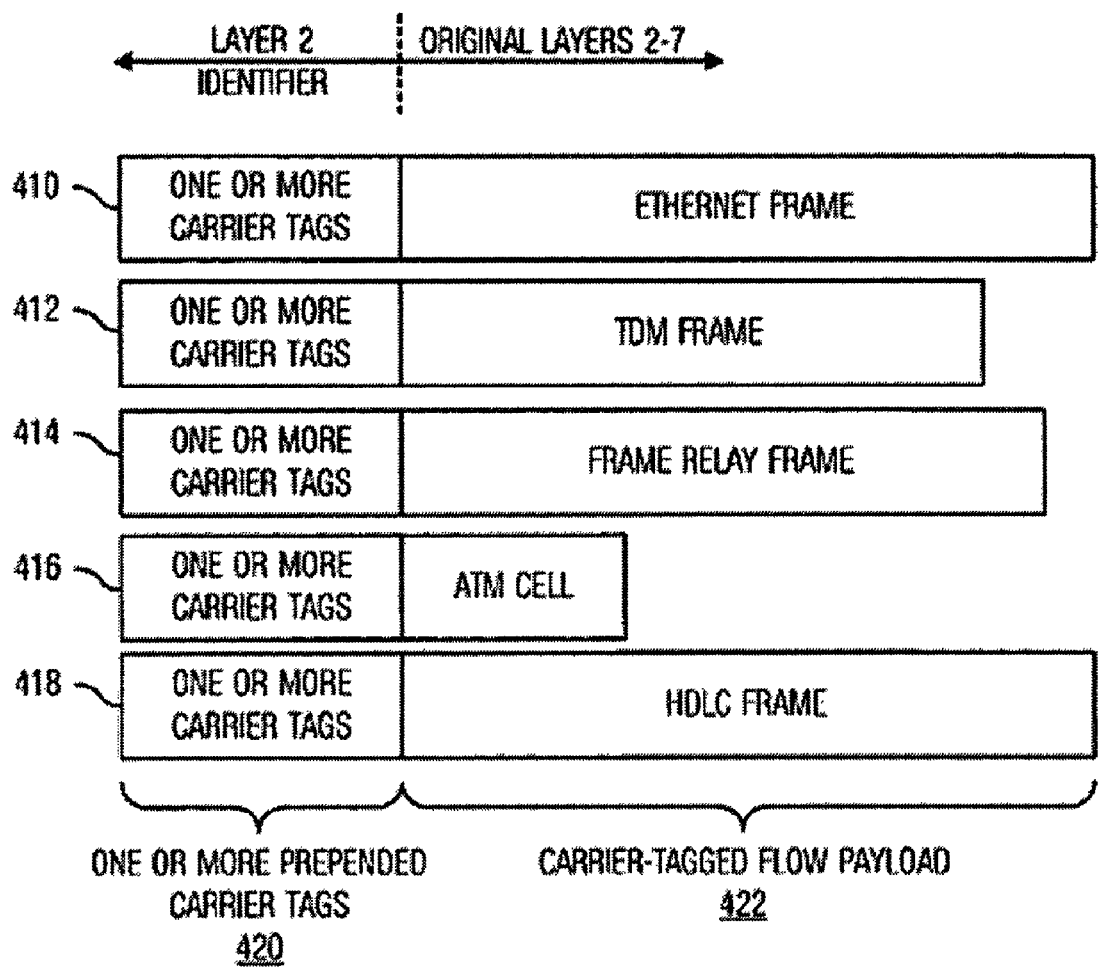
FIG. 3 illustrates examples of data messages or frames that may be transmitted into the access network, or received from the access network, in accordance with an exemplary embodiment.

FIG. 3 illustrates examples of data messages or frames that may be transmitted into the access network 100, or received from the access network, by the building aggregation system 114 in accordance with an exemplary embodiment. Each of one or more messages 410-418 may have two portions: a carrier-tagged flow payload 422 and one or more prepended carrier tags 420. The carrier-tagged flow payload 422 may represent, for example, the information as it is received from customer premise equipment at the customer site. The different types of messages shown correspond to various formats associated with a particular CPE interface, such as, for example, an Ethernet frame message 410 that may be associated with the Ethernet interface module 310, a TDM frame message 412 that may be associated with the private line interface module 312 or other TDM CPE, a frame relay frame message 414 that may be associated with the frame relay interface module 314, an ATM cell message 416 that may be associated with the ATM interface module 316, or the like. Other messages, such as a high-level data link control (HDLC) frame 418, an ATM application adaptation layer-5 (AAL5) protocol data unit (PDU) or the like, may also be used. In general, the messages may carry various types of customer data corresponding to layers 2-7 of the OSI Reference Model.

As FIG. 3 shows, each of one or more message types may be tagged and processed in a uniform manner by the addition of one or more carrier tags. FIG. 3 reflects the format of composite messages that may be sent between a building aggregation system 114, a service edge 112 and any other intervening elements. As illustrated in FIG. 3, the carrier-tagged flow payload 422 may be kept substantially intact, and a carrier tag 420 may be prepended to the carrier-tagged flow payload 422 to prepare it for transmission through the access network. Depending on implementation, the carrier tag 420 may include, for example, a pseudowire label, a VLAN identifier, a tunnel label or the like. Multiple carrier tags may be stacked within a message or frame to provide for a hierarchical aggregation and routing mechanism to be implemented in the access network.

In accordance with one exemplary embodiment, the building aggregator system 114, such as via interface modules 310-316, may perform the aforementioned carrier tagging of traffic received from CPE 116 and bound for the service edge 112. Likewise, the building aggregator system may receive from the service edge messages having such carrier tags and will remove the carrier tags and distribute the messages to the appropriate CPE-side link.

It is particularly noteworthy in FIG. 3 that, regardless of message type, all of the carrier tags 420 may be of uniform format. (In the case of tunnel labels, for example, messages of different types may even have the same tag value if they happen to be commonly routed.) The use of a uniform carrier tag format for all message types makes it possible for simple, generic handling of all traffic types through the access network using a uniform set of network elements that process traffic based on carrier tags. The switching elements within the access network may simply inspect the carrier tag(s) 420 of messages to determine how the message should be switched or routed without regard to message type or contents. In this manner, the access network becomes "service agnostic" and does not have to be concerned with the specifics of the protocols or addressing imbedded in the customer traffic. The generic nature of the carrier tag also allows for readily supporting any other message types not shown in FIG. 3, with little or no changes being required in the design and operation of the layer-2 switches 118 or other elements.

In some implementations, it may be desirable to prepend one or more tunnel labels (not shown) to the messages 410-418. This may be in addition to any pseudowire labels or other carrier tags already applied. A tunnel label allows a tunnel to be established throughout the access network, such as between a building aggregator and a service edge, improving scalability in the network. This mechanism may be particularly useful when many flows are to be routed to the same destination or service edge. By assigning the flows to a common tunnel, network elements, such as the layer-2 switch 118, may collectively route the service emulation instances within the tunnel by evaluating the tunnel label. In an exemplary embodiment, the tunnel label may be an LSP label prepended to the messages 410-418. In accordance with exemplary embodiments, tunnel labels may also be stacked to any degree needed to support a tunneling hierarchy, which may further facilitate efficient and scalable management of large numbers of flows.

Although the carrier-tagged flow payload 422 is shown and described as being kept essentially intact, it may be desirable in some situations to modify this original message. For example, the original message portion 422 of the Ethernet frame message 410 and the frame relay frame 414 may include a frame check sequence (FCS). In many networks, the FCS is not used and may be removed. In other cases, the Ethernet frame check sequence (FCS) as received in the Ethernet frame may optionally be included, as is, rather than being deleted or recalculated by the building aggregation system 114. This can be advantageous for detecting errors or corruption of the data that might occur as the customer payload traverses the network.

For traffic originating at a CPE 116 and bound for a service edge 112, a building aggregation system 114 may receive messages from multiple customer CPEs, where the messages may be received along different physical or logical ports associated with each customer flow. The building aggregation system may append one or more carrier tags to the incoming messages and otherwise encapsulate or process the messages to prepare them for transmission through the access network 100. The building aggregation system may send the carrier-tagged messages into the access network, which may be in the form of an aggregated flow over a wideband or broadband communications link. Likewise, the building aggregation system may operate in a complementary manner for traffic coming from a service edge that is bound for a CPE. The building aggregation system may receive carrier-tagged messages that have traversed the access network, interpret the carrier tags to determine where to distribute the message, 'decapsulate' the messages to remove the carrier tags, and distribute the messages to the appropriate physical and logical ports leading to the CPE.

To properly route traffic in either direction between each of one or more CPE flows and a corresponding access tunnel, the service emulation instance or logical networking tagged path, the building aggregation system 114 may maintain an association between a customer interface port and a particular carrier tag value or set of values. Where service emulation instances are used in the access network 100, the building aggregation system may maintain an association between customer-facing ports and a service emulation instance mapping identifier. Where pseudowires are used in the access network, the building aggregation system may maintain an association between customer-facing ports and a pseudowire label value. One or more tunnel labels or LSP labels may also be associated with customer ports, either directly or indirectly by association with pseudowires or service emulation instances. Any of these associations may be maintained, for example, in a look-up table which may be referred to as a management information base (MIB) or a forwarding information base (FIB). These associations may be established by negotiation or coordination with other access networks elements or by control applied to the building aggregation system by a provisioning system. The building aggregation system may also perform functions related to controlling traffic volumes and related to remotely managing demarcation devices.

Figure 4:
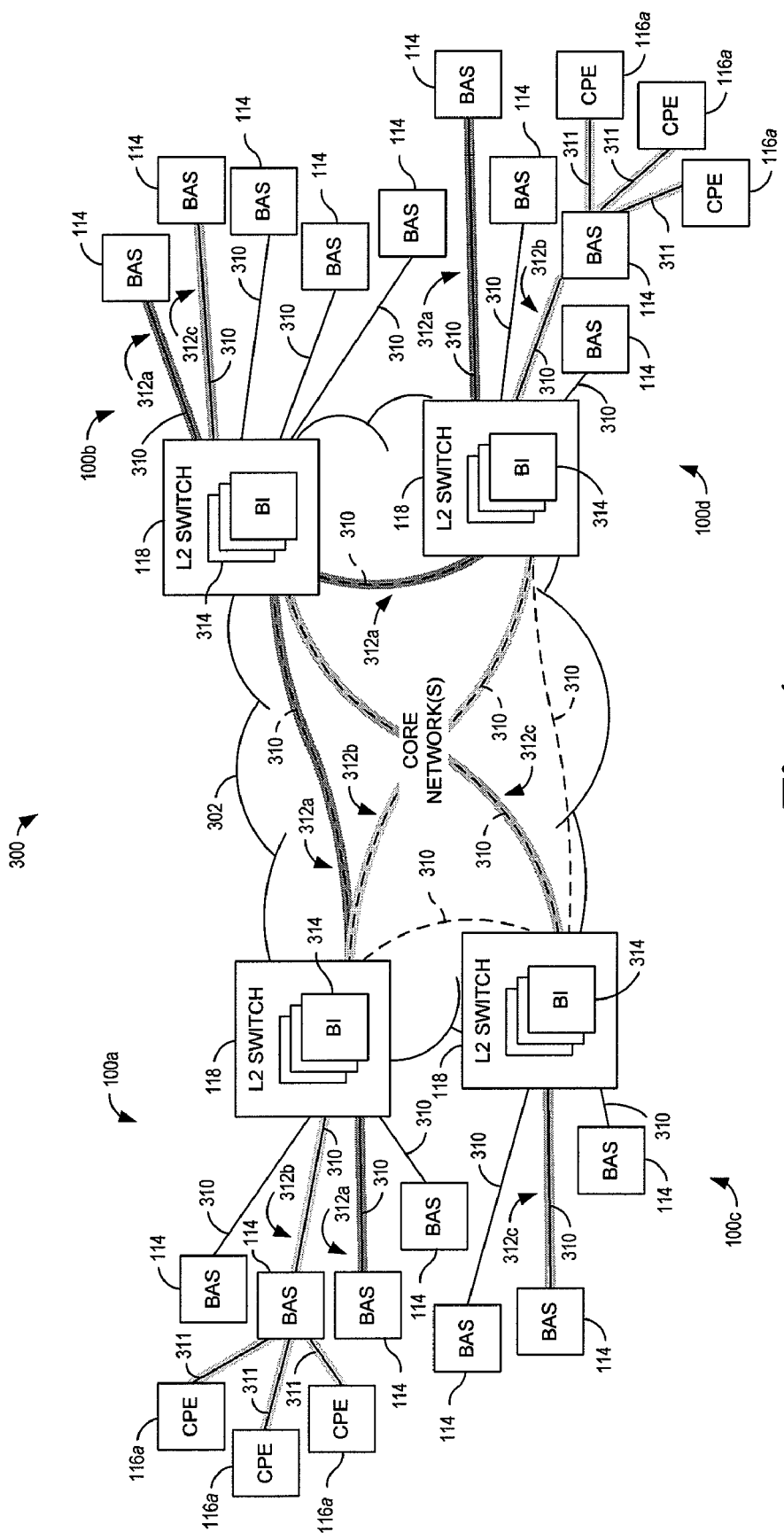
FIG. 4 is a functional block diagram of a network configuration or system for providing a virtual private LAN service (VPLS) to Ethernet customers, in accordance with one exemplary embodiment.

The access network 100 of exemplary embodiments may be utilized in any of a number of different configurations to provide any of a number of different types of services to one or more customers. One such network configuration or system 300 for providing a virtual private LAN service (VPLS) to Ethernet customers 116a, in accordance with one exemplary embodiment, is shown in FIG. 4. The system includes a number of access networks (four being shown, for example, as access networks 100a, 100b, 100c and 100d), although only portions of those access networks are shown for purposes of clarity. The access networks may be coupled to one or more core networks 302 of a service provider via respective service edges (not shown in FIG. 4). As indicated above, the core network(s) may include, for example, one or more of a system of TDM switches, such as a network of Class 3 telephone switches, an ATM and/or a frame relay network covering much the same geographical territory as the TDM network, or a network of IP (Internet Protocol) routers.

As also shown, the building aggregation systems (BASs) 114 of the access networks 100, and the access networks themselves, may be interconnected by tunnels 310, each of which may carry one or more carrier-tagged flows (not shown). Similar to those of FIG. 2, these tunnels may be in the form of LSPs (see FIG. 2, LSPs 210, 220, 221, 230 231, carrying carrier-tagged flows 211, 212 and 213), each of which corresponds to a pathway or a tunnel for carrying traffic between respective access networks. And as also shown, the CPEs 116a of a customer site 110 may be coupled to a respective BAS by an appropriate type of connection including a physical connection line and/or virtual link, which in the context of the illustrated system 300, may be referred to as an attachment circuit (AC) 311.

The system 300 may be configured to connect multiple CPEs 116a of a customer into in a single-bridged domain over the service provider's core network(s) 302. This domain may also, for example, be considered a customer's VPN. The system shown in FIG. 4 includes, for example, domains 312a, 312b and 312c. To effectuate such a configuration, the system may further include one or more bridging instances (BIs) 314 located proximate to or co-located with (as shown) one or more of the layer-2 switches 118 of the access networks 100, each layer-2 switch with one or more bridging instances including a bridging instance for each domain configured across the respective switch. A full mesh of tunnels 310 may interconnect the BIs. As further explained below, within a particular customer domain, these bridging instances may be configured to perform Media Access Control (MAC) address learning and routing of data packets or other information or content between CPEs 116a via their ACs 311 and carrier-tagged flows (carried by respective tunnels). Thus, in the illustrated system, a customer domain may be defined by one or more ACs, bridging instances and carrier-tagged flows.

As indicated above, within a customer domain 312, the BIs 314 may perform MAC address learning and routing of data packets or other information based on the MAC address fields of the Ethernet frames between CPEs 116a (see, e.g., FIG. 3, Ethernet frame message 410). As indicated above, a CPE may comprise one or more devices including, for example, a router or switch communicatively coupled to other routers, switches, hubs, user workstations, servers, printers, IP phones or the like. And as explained further below, the device(s) of a CPE may impact the number of MAC addresses required to send/receive data packets between the CPEs in the customer domain. In this regard, the MAC address of a router may support any devices communicatively coupled to that router. In contrast, knowledge of the MAC addresses of devices communicatively coupled to a switch, as well as that of the switch, may be required to route data packets to those devices and the switch. Thus, although MAC address learning and routing may be shown and described with respect to CPEs, the MAC addresses may more particularly refer to one or more devices of one or more CPEs.

Figure 5:
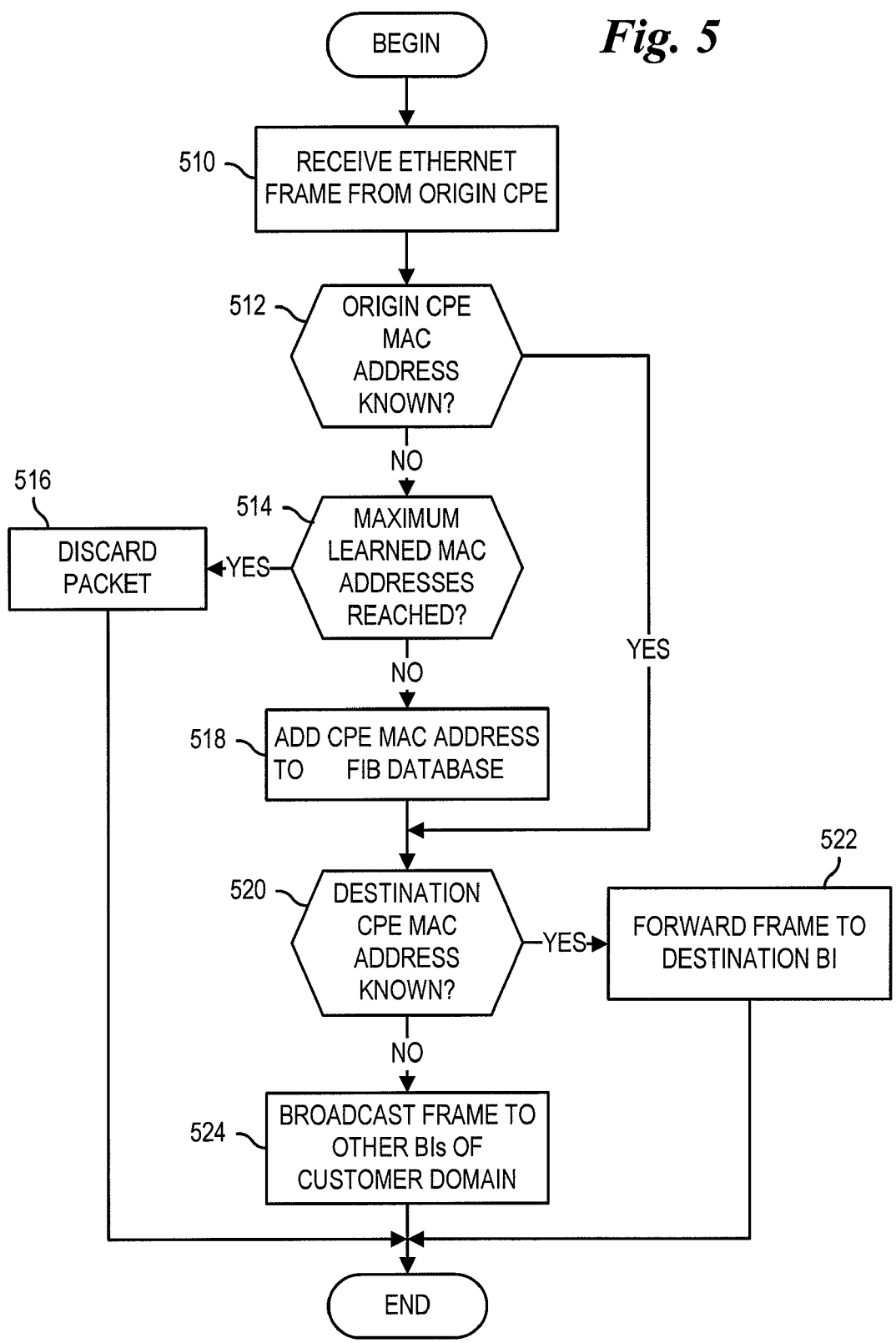
FIGS. 5 and 6 are flowcharts including various steps in a method of MAC address learning and routing in accordance with exemplary embodiments.
Figure 6:
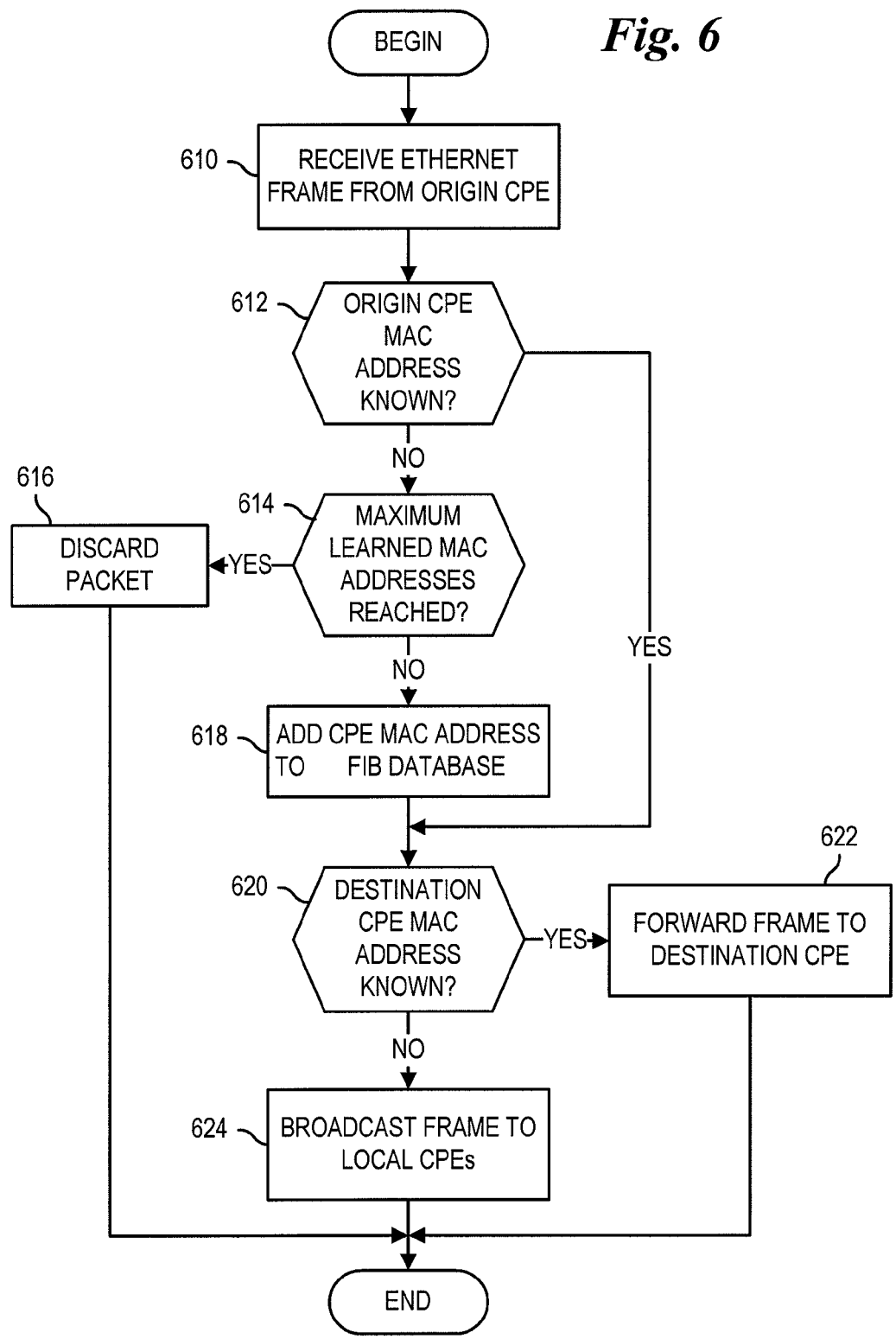

To perform MAC address routing, each BI 314 of a customer domain 312 may maintain a forwarding information base (FIB) database that tracks MAC address port origination. In this regard, the FIB database of a BI may identify MAC addresses of local CPEs along with the UNI/flow by which those CPEs 116a may be reached, and may identify MAC addresses of remote CPEs along with remote BIs by which those CPEs may be addressed. All that is needed for communication between two devices in a customer domain, however, is the MAC address of the remote CPE. Reference is now made to FIGS. 5 and 6, which illustrates various steps in a method of MAC address learning and routing in accordance with exemplary embodiments.

As shown at step 510, MAC address learning within a customer domain may include an origin CPE sending a packet to a destination CPE, which may be received by the BI local to the origin CPE (referred to as the origin BI). At step 512, on receipt of the packet, the origin BI determines whether the origin BI's FIB database includes an entry for the origin CPE (indicating that the origin BI has previously learned the MAC address of the origin CPE), thereby binding the origin CPE's MAC address to a local UNI/flow by which the origin CPE may be reached. If the origin BI has not learned the origin CPE's MAC address, the origin BI learns the local UNI/flow by which the origin CPE may be reached, adding it to the respective BI's FIB database.

In various instances, in designing a customer domain 312, the service provider may provision a maximum number of MAC addresses available for CPEs 116a within that domain, which may be reflected in a maximum size of the BI's FIB database. In such instances, the origin BI 314 may determine whether the maximum number of learned MAC addresses has been reached, as shown at step 514. If the maximum number of learned MAC addresses has been reached, the origin BI may discard the packet from the origin CPE, as shown at step 516. If the maximum number of learned MAC addresses has not been reached, the origin BI may then learn the origin CPE's MAC address (and local UNI/flow) and add it to the respective BI's FIB database, as shown at step 518.

At step 520, in addition to determining if the origin BI 314 has learned the origin CPE's MAC address, the origin BI may also determine if the BI has learned the destination CPE's MAC address (the address being found in the respective BI's FIB database along with a remote—destination BI—by which the destination CPE may be reached). If the origin BI has learned the destination CPE's MAC address, the origin BI may tunnel or otherwise forward the packet to the destination BI, as shown at step 522. If the origin BI has not learned the destination CPE's MAC address (or if the maximum number of learned MAC addresses has been reached), however, the origin BI may broadcast the packet to most, if not all, of the other BIs of the customer domain 312 (including the destination BI), as shown at step 524.

As shown at step 610 of FIG. 6, MAC address learning within a customer domain may continue at the destination BI 314 (or other BIs of the customer domain 312 in cases in which the origin BI had not previously learned the destination CPE 116a). At step 612, on receipt of the packet, the destination BI determines whether the destination BI's FIB database includes an entry for the origin CPE (indicating that the destination BI has previously learned the MAC address of the origin CPE), thereby binding the origin CPE's MAC address to a remote BI from which the origin CPE may be reached. If the destination BI has not learned the origin CPE's MAC address, the destination BI learns the remote BI from which the origin CPE may be reached, adding it to the respective destination BI's FIB database.

In instances including a maximum number of MAC addresses available for CPEs 116a within the customer domain, the destination BI 314 may determine whether the maximum number of learned MAC addresses has been reached, as shown at step 614. If the maximum number of learned MAC addresses has been reached, the destination BI may discard the packet from the origin CPE, as shown at step 616. If the maximum number of learned MAC addresses has not been reached, the destination BI may then learn the origin CPE's MAC address (and remote—origin—BI) and add it to the respective BI's FIB database, as shown at step 618.

At step 620, in addition to determining if the destination BI 314 has learned the origin CPE's MAC address, the destination BI may also determine if the BI has learned the destination CPE's MAC address (the address being found in the respective BI's FIB database along with a local UNI/flow by which that CPE may be reached). If the destination BI has learned the destination CPE's MAC address, the destination BI may tunnel or otherwise forward the packet to the destination CPE, as shown at step 622. If the destination BI has not learned the destination CPE's MAC address (or if the maximum number of learned MAC addresses has been reached), however, the destination BI may broadcast the packet to most, if not all, of the CPEs local to the destination BI in the customer domain 312 (including the destination CPE), as shown at step 624.

The above process may be repeated for a packet from each CPE 116a in the customer domain 312 for the BIs 314 to learn the CPEs in the customer domain, at least until the maximum number of learned MAC addresses has been reached. In various instances, one or more of the FIB databases of the BIs may be cleared after a particular time period, after which the process above may be repeated to relearn the MAC addresses. Additionally or alternatively, MAC addresses that are inactive for a particular time period (e.g., five minutes) may be dropped from the FIB database of one or more of the BIs.

Also in operation, one or more of the building aggregation systems 114 within a customer domain 312 may include a policing function, a packing/unpacking function, a maximum transmission unit (MTU) control, a demarcation device manager, a provisioning and operations function, and a control and maintenance function. Exemplary embodiments are more particularly described below with respect to the policing function. For more information as to the other functions, reference is made to U.S. patent application Ser. No. 10/858, 503, entitled: Method and Apparatus for Processing Labeled Flows in a Communications Access Network, the content of which is hereby incorporated by reference in its entirety.

The policing function may be responsible for monitoring a customer's traffic and controlling the customer's bandwidth, or rate at which customer traffic enters and passes through the customer domain 312. The policing function may involve marking or dropping of customer packets or frames that exceed configured threshold values. Dropping or discarding of packets may occur when traffic from the customer exceeds a maximum bandwidth. Packets that represent an excessive bandwidth may simply not be forwarded across the customer domain. When this happens, the policing function may notify the respective CPE 116 of the data loss, whereupon the CPE may throttle back or take action to recover from the lost data. The building aggregation system may also engage in customary flow control coordination with CPE to regulate incoming bandwidths of flows, for example, using "pause" or "ready to receive" control messages of some nature that are well known among those of ordinary skill in the art.

In contrast to dropping packets, marking relates to designating which packets, if any, may be dropped later during transmission if the network or a network element becomes too busy to handle all of the customer's traffic. Generally, a customer may contract with a service provider for a guaranteed minimum bandwidth, as well as an absolute maximum or "burstable" bandwidth that may be supported as long as the network is not too congested to handle it. At times, the customer may attempt to send traffic at a bandwidth in excess of the guaranteed bandwidth. While the network may generally accommodate the higher bandwidth in these situations, it is desirable to set a discard eligibility bit in the message header. This allows downstream network elements to selectively discard some of the customer's traffic if they are overburdened with other network traffic. In accordance with one exemplary embodiment, the least significant bit (LSB) within an Experimental field of an MPLS label maybe used to indicate discard eligibility. In effect, when a customer has exceeded a guaranteed bandwidth and begins to experience data loss due to network congestion, the customer may reduce bandwidth or take other measures until the network congestion subsides. In some cases, transport protocols operating within the CPE 116 may sense the data loss and may automatically perform flow control to effectively reduce the bandwidth. A marking process that may be performed as part of policing function is discussed in greater detail below with reference to FIG. 7. The policing function may also encompass metering or rate limiting to adjust the timing of forwarding of packets for better control of variable rate traffic.

In accordance with one exemplary embodiment, policing of customer traffic may extend across multiple service types and multiple logical or physical ports. For example, a customer may contract for two individual flows having certain committed minimum and maximum burstable bandwidths. The QoS measures implemented in the building aggregation system 114 may also control the sum of the two flows to remain below a certain limit, even if the flows are of different types or enter the building aggregation system along different ports. Minimum and maximum bandwidths may even be applied in a hierarchical nature, for example, by company, department, employee, device, service type or specific flow.

Figure 7:
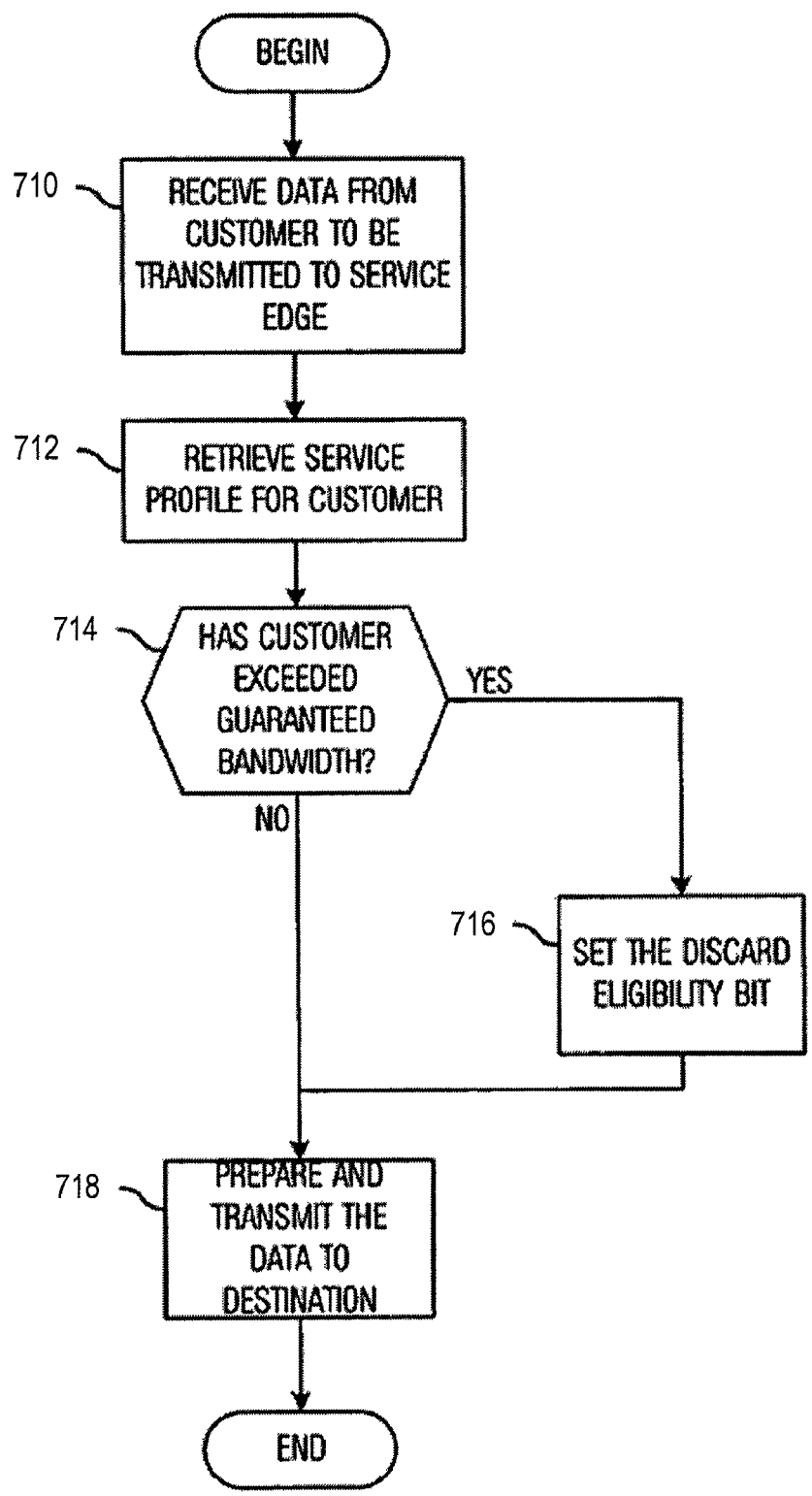
FIG. 7 is a flowchart including various steps in a method of marking or dropping of customer packets that may be performed by a policing function of the building aggregation system, in accordance with an exemplary embodiment.

FIG. 7 is a flowchart including various steps in a method of marking or dropping of customer packets that may be performed by the policing function of the building aggregation system 114 in accordance with an exemplary embodiment. The process begins in step 710, wherein a unit of data traffic, such as a data frame, is received from a CPE 116 within the customer domain 312. Then, in step 712, a VPLS service profile for the customer is retrieved from memory or other data storage devices. The service profile describes attributes of the VPLS service to which the customer is subscribed. This service may have its own requirements, such as a guaranteed or "committed" minimum data rate that the service provider promises to make available at all times. The guaranteed amount of bandwidth as specified in the service profile is compared to the bandwidth currently being consumed by the customer in step 714.

If a determination is made in step 714 that the data is in excess of the guaranteed data rate as specified in the service profile, then execution proceeds to step 716, wherein a discard eligibility bit is set to indicate to downstream network elements that the data frame may be regarded as discardable if the network is busy or heavily congested. In accordance with one exemplary embodiment, a discard eligibility indication may even be applied to traffic types which lack an equivalent attribute in the native protocol. For example, the least significant bit (LSB) within the Experimental field of an MPLS label maybe used to indicate discard eligibility. Thus, consistent QoS measures may be extended to flows of all types.

Those of ordinary skill in the art will recognize how steps 714 and 716 may actually be implemented using a "token bucket" approach or other techniques to discern data frames that represent excess beyond a certain volume per unit time. Policing or rate limiting of customer flows may also take into account a maximum burst duration that may be configured for a flow according to a service profile that describes the flow attributes.

Whether or not step 716 is performed responsive to the determination in step 714, processing proceeds to step 718, wherein the data is prepared and transmitted to the VPLS service edge via the associated carrier-tagged flow. Preparation of the data for transmission may include, for example, formatting the data for transport via a TDM communications link or a packet-based communications link, identifying the correct carrier-tagged flow that is to carry the data associated with the data, appending a carrier tag to the data, and other processing as described herein.

In accordance with exemplary embodiments, an apparatus, method and computer-readable storage medium may be provided whereby a customer, service provider, or other entity in communication with the customer or service provider may calculate one or more requirements of the customer of a VPLS service. These requirements may include, for example, an estimate of the quantity of MAC addresses required for devices of the CPEs 116a of the customer's domain 312. In addition, the requirements may include an estimated bandwidth requirement (e.g., layer-2 bandwidth requirement) of the customer, such as to facilitate selecting the minimum bandwidth, maximum bandwidth or some other appropriate bandwidth for one or more flows from each CPE 116a within the customer domain. Other requirements may include an estimated throughput requirement of the customer, such as to facilitate selecting the minimum bandwidth, maximum bandwidth or some other appropriate bandwidth. For more information on such a throughput requirement, see U.S. patent application Ser. No. 11/873,877, entitled: Apparatus, Method and Computer-Readable Storage Medium for Calculating Throughput Requirements of a Network, filed concurrently herewith, the content of which is hereby incorporated by reference in its entirety.

A method of calculating an estimated addressing requirement and a method of calculating an estimated bandwidth requirement will now be described with reference to FIGS. 8 and 9, respectively. In accordance with exemplary embodiments, the estimated addressing requirement for a customer domain 312 may be calculated based on estimated addressing requirements for the CPEs 116a within the customer domain. The addressing requirement for each of one or more of the CPEs within the domain may be calculated based on the device of the CPE with which the domain communicates with the CPE (i.e., the CPE interface), and if appropriate, one or more additional devices of the CPE. As indicated above, the MAC address of a router may support any devices communicatively coupled to that router, whereas knowledge of the MAC addresses of devices communicatively coupled to a switch, as well as that of the switch, may be required to route data packets to those devices and the switch. Thus, if the CPE interface comprises a router, the respective CPE may only require one MAC address. If the CPE interface does not include a router and instead includes a switch, however, the respective CPE may require a MAC address for that switch, as well as any other routers, switches, hubs, user workstations, servers, printers, IP phones or the like of the CPE communicatively coupled to that switch.

Figure 8:
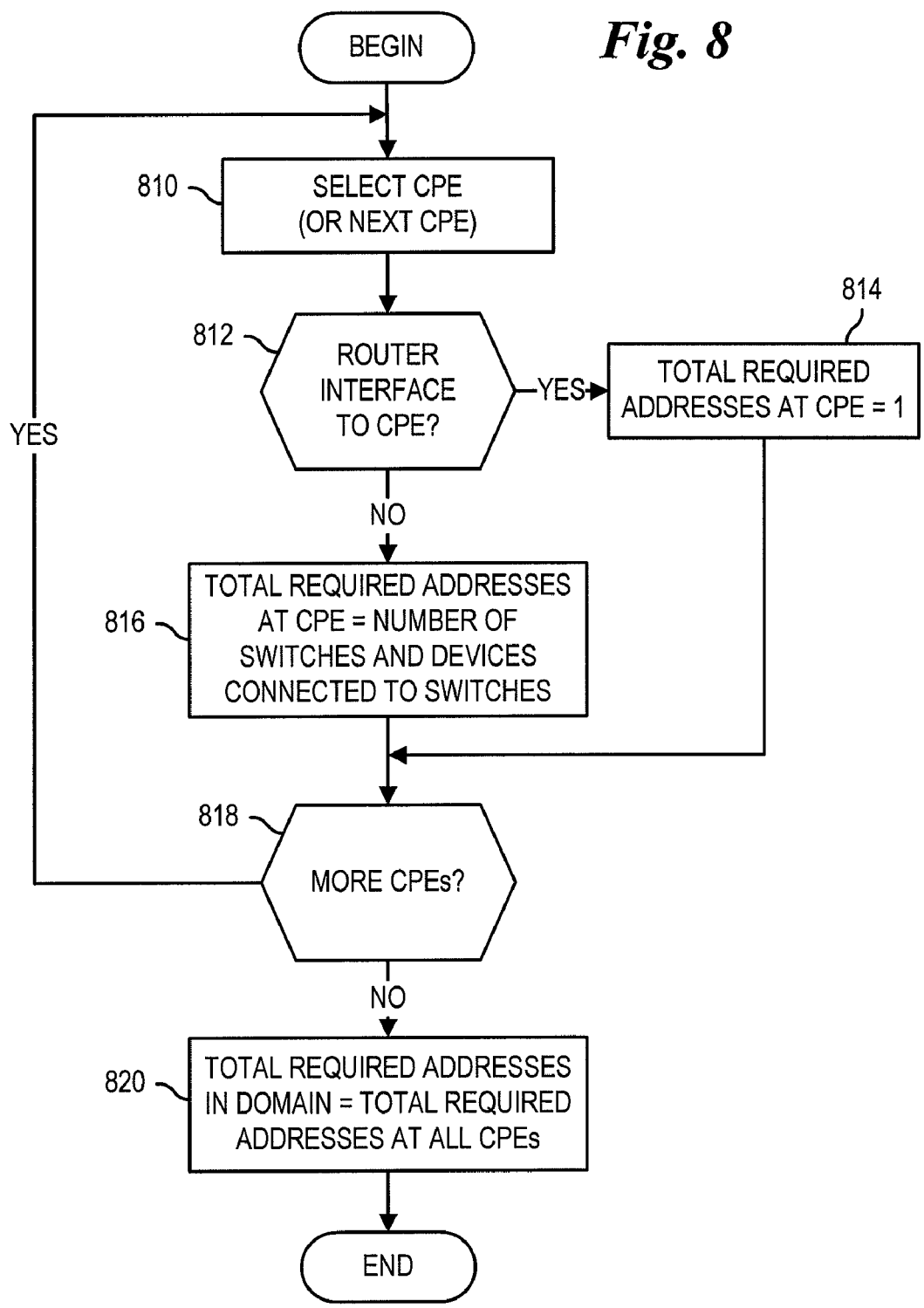
FIGS. 8 and 9 are flowcharts including various steps in a method of calculating an estimated addressing requirement and a method of calculating an estimated bandwidth requirement, respectively, in accordance with exemplary embodiments.

More particularly now with reference to FIG. 8, a method of calculating an estimated addressing requirement for a customer domain 312 may include selecting a CPE 116a of the customer domain, as shown at step 810. At step 812, a determination is made whether the CPE interface (i.e., CPE device with which the domain interfaces with the respective CPE) comprises a router. If the CPE interface does comprise a router, the MAC addressing requirement for the CPE may be set as one, a shown at step 814. If the CPE interface does not comprise a router, but instead another device such as a switch, the MAC addressing requirement for the CPE may be calculated by summing all switches and devices communicatively coupled to those switches to form the respective CPE, as shown at step 816. As will be appreciated, however, any devices communicatively coupled to a switch via a router may be left out of the sum as the MAC address of the router may support those devices. At step 818, and again at steps 810-816, a MAC addressing requirement may be calculated for each CPE 116a of the customer domain 312. Then, at step 820, the MAC addressing requirement for the domain may then be calculated by summing the requirements of the CPEs within that domain.

In various instances, the VPLS service provider make available incremental numbers of MAC addresses to a customer domain 312. In one exemplary embodiment, a block of fifty MAC addresses may be initially allocated per twenty-five carrier-tagged flows of the customer domain. In such instances, presuming one carrier-tagged flow per CPE 116a, the number of required MAC address blocks (domain address-block requirement) may be calculated by dividing the MAC addressing requirement for the domain by the number of MAC addresses per block (e.g., fifty), and rounding the result up to the nearest integer. If the calculated, domain address-block requirement exceeds the number of allocated blocks for the number of carrier-tagged flows of the customer domain, the service provider may allocate additional blocks of addresses to the customer (e.g., for an additional fee) so that the domain address-block requirement is less than or equal to the number of allocated blocks. Additionally or alternatively, the MAC addressing requirement for the domain may be reduced, such as by replacing one or more switches with routers, to reduce the domain address-block requirement so that the domain address-block requirement is less than or equal to the number of allocated blocks.

In addition to or in lieu of calculating an estimated addressing requirement for a customer domain 312, an estimated bandwidth requirement for the customer domain may be calculated. More particularly, exemplary embodiments may calculate an estimated bandwidth requirement for each of one or more CPEs 116a of the customer domain based on bandwidth requirements for communication between a respective CPE and the other CPEs in the domain. In this regard, an estimated bandwidth requirement for a CPE may more particularly refer to an estimated bandwidth requirement for one or more flows from the respective CPE, which need not correspond to a particular bandwidth capability of the CPE interface itself. As shown and described herein, the bandwidth requirement may be a maximum bandwidth requirement. It should be understood, however, that exemplary embodiments may be equally applicable to a bandwidth requirement less than a maximum bandwidth.

Figure 9:
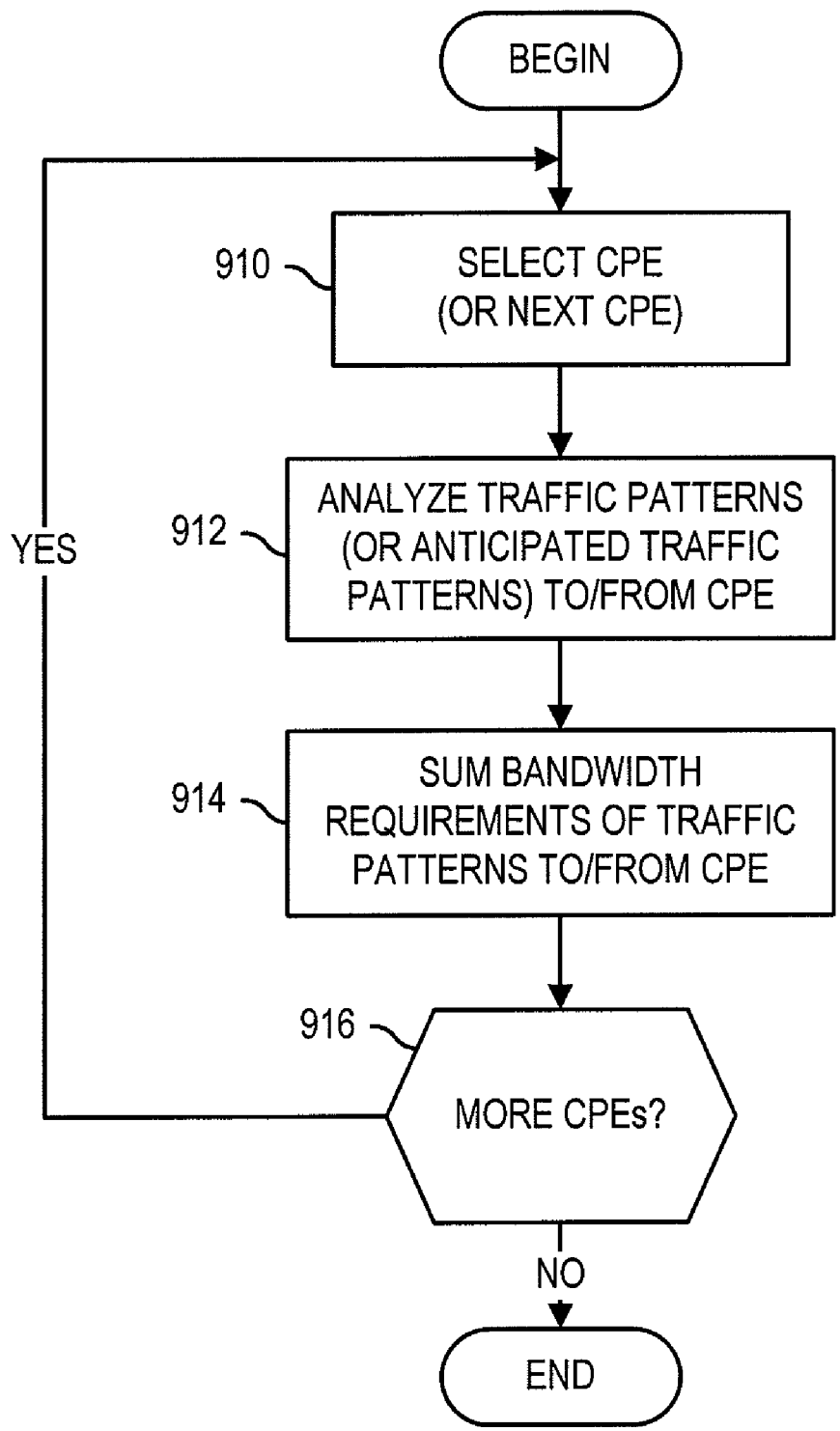

Referring now to FIG. 9, a method of calculating a bandwidth requirement of a customer domain 312 in accordance with one exemplary embodiment may begin in step 910, wherein a CPE 116a of the customer domain is selected. At step 912, traffic patterns (or anticipated traffic patterns) of the selected CPE with respect to other CPEs in the domain may be analyzed, including determining associated bandwidth requirements for the selected CPE with respect to the other CPEs. For the selected CPE and another CPE, the associated bandwidth requirement may be, for example, the bandwidth requirement for traffic flow from the selected CPE to the other CPE. The traffic flow may include, for example, traffic from one or more (or even all) devices of the selected CPE that may flow from the selected CPE at any particular time. In various other instances, for example, the associated bandwidth requirement may be the bandwidth requirement for traffic flow to the selected CPE from the other CPE including, for example, traffic from one or more (or all) devices of the other CPE. And in even further instances, for example, the associated bandwidth requirement may be the sum of the aforementioned bandwidth requirements for traffic flow between the selected CPE and the other CPE, the maximum bandwidth requirement between the aforementioned bandwidth requirements for traffic flow between the selected CPE and the other CPE, or the like.

Regardless of the exact bandwidth flow requirement, at step 914, the bandwidth requirement for the selected CPE may be calculated by summing the bandwidth requirements of the selected CPE with respect to the other CPEs. In this manner, the bandwidth requirement for the selected CPE may account for traffic flow between the selected CPE and one or more other CPEs. At step 916, and again at steps 910-914, the process may be repeated for each CPE of the customer domain to thereby calculate a bandwidth requirement for each CPE.

In various instances, the service provider may make available incremental bandwidths to CPEs 116a within a customer domain 312. In one exemplary scenario, for bandwidths up to and including 10 Mbps, the service provider may make bandwidths available in 1 Mbps increments. Then, for bandwidths greater than between 10 Mbps and 50 Mbps (and including 50 Mbps), the service provider may make bandwidths available in 5 Mbps increments. For bandwidths between 50 and 100 Mbps (and including 100 Mbps), the service provider may make bandwidths available in 10 Mbps increments. For bandwidths between 100 and 200 Mbps (and including 200 Mbps), the service provider may make bandwidths available in 50 Mbps increments. And for bandwidths between 200 Mbps and 1 Gbps (and including 1 Gbps), the service provider may make bandwidths available in 100 Mbps increments. In such instances, an available bandwidth (bps_req) may be selected for a CPE based on the calculated bandwidth requirement (calc_bps_req) as follows:

If calc_bps_req<10 Mbps, bps_req=CEILING (calc_bps_req, 1); else,

If calc_bps_req<51 Mbps, bps_req=CEILING (calc_bps_req, 5); else,

If calc_bps_req<101 Mbps, bps_req=CEILING (calc_bps_req, 10); else,

If calc_bps_req<201 Mbps, bps_req=CEILING (calc_bps_req, 50); else, bps_req=CEILING (calc_bps_req, 100).

In the preceding, CEILING (x, y) is a function for rounding a number x to the nearest multiple of significance y.

As explained herein, the requirements of a customer domain 312 may be calculated for any of a number of different purposes. In one exemplary embodiment, the requirements may be calculated in designing the customer domain so that the appropriate resources may be provisioned to that domain. If the domain has already been designed, however, one or more of the requirements may be calculated to appropriately adjust the resources provisioned to that domain.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. More particularly, implementations of certain embodiments may take the form of one or more computer software macros operable with spreadsheet computer software such as Excel, distributed by the Microsoft Corporation of Redmond, Wash. Any suitable computer-readable storage medium may be utilized including hard disks, CD-ROMs, optical storage devices, or magnetic storage devices.

In the preceding specification, various embodiments have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A computer-implemented method comprising:
   selecting, by at least one processor, a customer premises equipment (CPE) of a domain including a plurality of CPEs, each CPE including one or more devices, one of the one or more devices comprising an interface with which the domain communicates with the respective CPE;
   determining, by the at least one processor, if the interface of the selected CPE comprises a router; and
   calculating, by the at least one processor, an addressing requirement of the selected CPE, the addressing requirement including a number of device addresses for the selected CPE, wherein calculating an addressing requirement comprises:
     setting the addressing requirement as one if the interface comprises a router; otherwise,
     summing a number of switches of the selected CPE and a number of devices of the selected CPE communicatively coupled to the respective switches.

2. The computer-implemented method according to claim 1, wherein selecting the CPE of the domain, determining if the interface of the selected CPE comprises a router, and calculating an addressing requirement of the selected CPE occurs for the plurality of CPEs of the domain, and
   wherein the method further comprises calculating an addressing requirement of the domain by summing the addressing requirements of the CPEs of the domain.

3. The computer-implemented method according to claim 1, wherein calculating an addressing requirement comprises calculating a data link layer addressing requirement including a number of data link layer addresses.

4. The computer-implemented method according to claim 1, wherein the domain includes a given number of traffic flows for communicating between CPEs, the domain being allocated a block of addresses per a given number of traffic flows, and wherein calculating the addressing requirement further comprises:
   calculating a number of blocks of addresses for the domain based on the calculated addressing requirement and a number of device addresses per block of addresses.

5. The computer-implemented method according to claim 1 further comprising:
   analyzing traffic patterns of the selected CPE with respect to one or more other CPEs of the domain, including determining associated bandwidth requirements for the selected CPE with respect to the one or more other CPEs; and
   calculating a bandwidth requirement of the selected CPE by summing the bandwidth requirements for the selected CPE with respect to the one or more other CPEs.

6. A computer-readable non-transitory storage medium having computer-readable program code portions stored therein and readable by a processor for at least one of performing or facilitating performance of a method, the method comprising:
   selecting a customer premises equipment (CPE) of a domain including a plurality of CPEs, each CPE including one or more devices, one of the one or more devices comprising an interface with which the domain communicates with the respective CPE;
   determining if the interface of the selected CPE comprises a router; and
   calculating an addressing requirement of the selected CPE, the addressing requirement including a number of device addresses for the selected CPE, wherein calculating an addressing requirement comprises:
setting the addressing requirement as one if the interface comprises a router; otherwise,
summing a number of switches of the selected CPE and a number of devices of the selected CPE communicatively coupled to the respective switches,
wherein the computer-readable program code portions are configured to perform at least one of the selecting the CPE, determining if the interface of the selected CPE comprises a router, setting the addressing requirement, or summing a number of switches and a number of devices of the selected CPE communicatively coupled to the respective switches.

7. The computer-readable non-transitory storage medium according to claim 6, wherein selecting the CPE of the domain, determining if the interface of the selected CPE comprises a router, and calculating an addressing requirement of the selected CPE occurs for the plurality of CPEs of the domain, and
wherein the method further comprises calculating an addressing requirement of the domain by summing the addressing requirements of the CPEs of the domain.

8. The computer-readable non-transitory storage medium according to claim 6, wherein calculating an addressing requirement comprises calculating a data link layer addressing requirement including a number of data link layer addresses.

9. The computer-readable non-transitory storage medium according to claim 6, wherein the domain includes a given number of traffic flows for communicating between CPEs, the domain being allocated a block of addresses per a given number of traffic flows, and wherein calculating the addressing requirement further comprises:
calculating a number of blocks of addresses for the domain based on the calculated addressing requirement and a number of device addresses per block of addresses.

10. The computer-readable non-transitory storage medium according to claim 6 further comprising:
analyzing traffic patterns of the selected CPE with respect to one or more other CPEs of the domain, including determining associated bandwidth requirements for the selected CPE with respect to the one or more other CPEs; and
calculating a bandwidth requirement of the selected CPE by summing the bandwidth requirements for the selected CPE with respect to the one or more other CPEs.

* * * * *